United States Patent
Horiuchi

[15] 3,645,242
[45] Feb. 29, 1972

[54] CRANKCASE VENTILATION VALVE
[72] Inventor: Hideo Horiuchi, Yokohama, Japan
[73] Assignee: Nissan Jidosha Kabushiki Kaisha, Yokohama, Japan
[22] Filed: Mar. 31, 1971
[21] Appl. No.: 130,025

Related U.S. Application Data
[63] Continuation of Ser. No. 826,220, May 20, 1969, abandoned.

[52] U.S. Cl..........................................123/119 B, 137/480
[51] Int. Cl........................................F02f 9/00, F02m 25/06
[58] Field of Search..................123/119, 119 B; 137/480

[56] References Cited

UNITED STATES PATENTS

| | | | |
|---|---|---|---|
| 3,105,477 | 10/1963 | Lowther | 123/119 B |
| 3,165,097 | 1/1965 | Lowther | 123/119 B |
| 3,263,699 | 8/1966 | Givler et al. | 123/119 B |
| 3,437,082 | 4/1969 | Bouwkamp et al. | 123/119 B |

Primary Examiner—Wendell E. Burns
Attorney—Sughrue, Rothwell, Mion, Zinn & Macpeak

[57] ABSTRACT

A crankcase ventilation valve located in a conduit connected between the crankcase and the intake manifold of an internal combustion engine, and including a movable rod located in the housing of said valve. The movable rod has a large diameter first metering portion operating in conjunction at all times with a first orifice for metering the flow of gas through the valve and forming a differential pressure applying area of the rod. In addition, the rod has a second smaller diameter metering portion thereon positioned longitudinally downstream of said first metering portion and operating in conjunction with a second smaller diameter orifice. The second smaller diameter metering portion and orifice act to further reduce the flow rate of gasses through the crankcase ventilation valve at increased negative pressures above a predetermined point, nullify the flow restriction effect of the first orifice and form a smaller differential pressure applying area.

4 Claims, 14 Drawing Figures

PATENTED FEB 29 1972

CRANKCASE VENTILATION VALVE

This application is a continuation of application Ser. No. 826,220 filed May 20, 1969 now abandoned.

This invention relates to a crankcase ventilation valve, and more particularly to a crankcase ventilation valve to be inserted between the crankcase and the intake manifold of an internal combustion engine, which ventilation valve controls flow rate of gas therethrough in response to variation in negative pressure at the intake manifold.

In a known crankcase ventilation valve, in order to achieve the required flow rate characteristics, the use is made of a rod having a metering portion comprising in combination a conical section and a cylindrical section, so as to vary the effective sectional area through which gas flow in response to the required flow rate. Such rod of known ventilation valve has drawback in that the rod is difficult to manufacture, due to its complicated configuration.

Furthermore, the area of the valve to which the differential pressure is applied to actuate the valve rod of known ventilation valves is substantially the same throughout the entire negative pressure range in the intake manifold, while requiring the valve rod to respond to a wide range of forces applied thereto.

The primary object of the present invention is to obviate the above-mentioned difficulties of the known crankcase ventilation valves.

According to the present invention, a crankcase ventilation valve provided in a conduit or gas flow passage between the crankcase and intake manifold of an internal combustion engine for controlling the flow rate of gasses from the crankcase to the intake manifold comprises a cylindrical valve housing in which a first orifice and a second orifice are located, said first orifice having a larger diameter relative to said second orifice and said first orifice being positioned upstream of the gas flow relative to said second orifice. A valve rod is coaxially disposed in said housing and has a first and a second metering portion thereon, said metering portions spaced longitudinally on said rod, with said first metering portion normally cooperating with said first orifice at all times, and said second metering portion being axially movable into said second orifice under relatively high negative intake manifold pressure conditions. The first metering portion is adapted to define a first flow restriction through said valve and cooperates with said first orifice for forming a main area to which the pressure differential across the valve is applied when said second metering portion is not moved into cooperation with said second orifice.

The second metering portion is adapted to define a second flow restriction through the valve upon cooperation with the second orifice and also forms another main area to which the pressure differential across the valve is applied and nullifies flow restriction effect of the first restriction.

A spring is inserted between a portion of the housing and the valve rod to bias the second metering portion of the valve rod away from the second orifice, whereby the flow rate across the rod, as well as the displacement rate of the rod, is decreased as the negative pressure in the intake manifold increases.

By providing the first metering portion with a large diameter for restricting the flow rate through the valve only when the negative pressure in the intake manifold is relatively low and the second metering portion having a small diameter for restricting the flow rate only when the negative pressure is relatively high, the flow rate characteristics of the crankcase ventilation valve at both low- and high-negative intake manifold pressures can be determined independently without requiring the use of a tapered valve rod used in the known crankcase ventilation valve construction. Furthermore, two different areas for applying differential pressure thereto are provided so that the displacement rate of the valve at a given pressure differential is not determined by spring force alone. Thus, the range of forces applied to the valve rod can be easily controlled to attain desired force-displacement characteristics of the valve.

According to a further feature of the present invention, the upstream peripheral edge of the second orifice and the downstream peripheral edge of the second metering portion cooperate to restrict the fluid flow as the rod is moved toward the second orifice by an increase in the negative pressure in the intake manifold before the second metering portion is moved into the second orifice, so that the pressure drop across the first metering portion and the area to which the effective differential pressure is applied are decreased, whereby the flow rate across the valve rod and the displacement rate of the valve rod are decreased as the negative intake manifold pressure is increased.

At the transition between low- and high-negative pressures, the overall pressure drop across the valve rod is applied to the first metering portion and to the opposing edges of the second orifice and the second metering portion, so that the pressure drop across the first metering portion is decreased. The effective area to which the negative differential pressure is applied also decreases as the negative pressure in the intake manifold is increased. Thus, a smooth transient characteristic is attained without using the conical valve rod of known crankcase ventilation valves.

For a better understanding of the invention, reference is made to the accompanying drawings, in which.

Like parts and members are designated by like numerals and symbols throughout the drawings.

Figure 1:
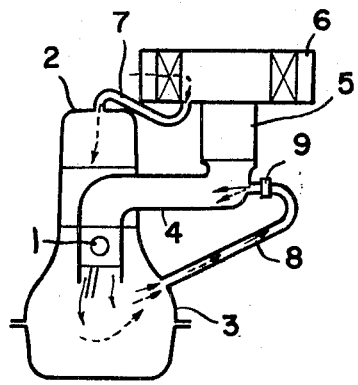
FIG. 1 is an elevation of an internal combustion engine equipped with a crankcase ventilation valve according to the present invention.

Referring to FIG. 1, an internal combustion engine comprises a piston cylinder portion 1, a rocker cover 2, a crankcase 3, an intake manifold 4, a carburetor 5, and an air cleaner 6 connected to the rocker cover 2 through a hose 7. In order to prevent undesirable effects of the air or blowby gas in the crankcase 3 on lubricant therein, the crankcase 3 is communicated with the intake manifold 4 through a pipe 8 and a crankcase ventilation valve 9 is mounted on such pipe 8, so that the air and the blowby gas in the crankcase 3 can be continuously ventilated.

Figure 2A:
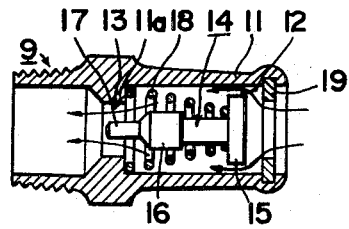
FIGS. 2a to 2e are schematic sectional views, illustrating the operation of the crankcase ventilation valve according to the present invention.

FIGS. 2a to 2e show the construction of a crankcase ventilation valve according to the present invention. The crankcase ventilation valve 9 comprises a cylindrical hollow housing 11 having a lateral partition wall 11a and a flow rate controlling rod 14 fitted within the housing 11. An orifice 13 is coaxially bored through the partition wall 11a, and a part of the cylindrical inside space of the housing 11 to the right of the partition wall 11a acts as another orifice 12, as shown in FIG. 2a. The rod 14 has a pair of metering portions 15 and 16 cooperating with the two orifice portions 12 and 13, respectively. It is also possible to form an orifice 12 having a diameter different from the inner diameter of either the orifice 13 or the housing 11, so as to control gas flow rate therethrough by a cooperating metering portion 16 of matching dimensions. It should be noted here that the metering portions are formed in cylindrical shape and they are not tapered. A guide member 17 is formed at the tip of the rod 14, so as to guide the movement of the rod 14 in the orifice 13, and the guide member is a solid cylinder having a comparatively small diameter. The housing 11 has a stepped portion in the proximity of the orifice 13, and the rod 14 includes a cooperating stepped portion, so that a coiled spring 18 can be supported by the two stepped portions. In order to prevent back fires, a ring shape washer 19 is fitted on the right-hand end of the cylindrical housing 11, as seen in the figures.

Figure 2B:
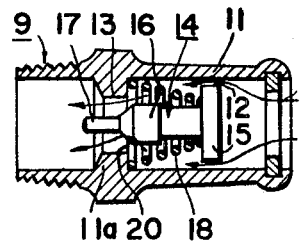
Figure 2C:
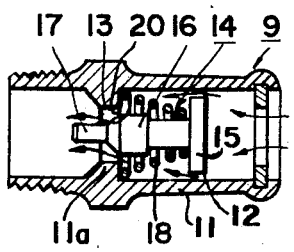
Figure 2D:
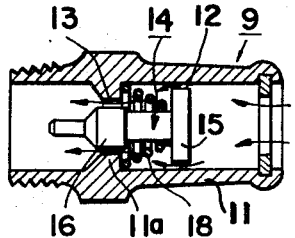
Figure 2E:
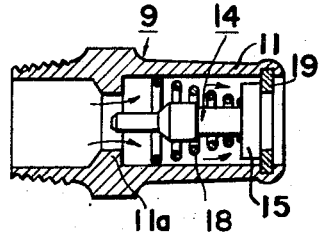
Figure 3:
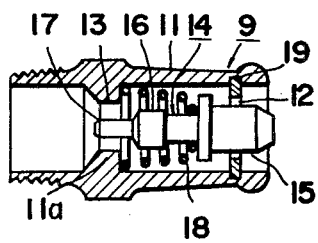
FIG. 3 is a sectional view of another embodiment of the crankcase ventilation valve according to the present invention.
Figure 8:
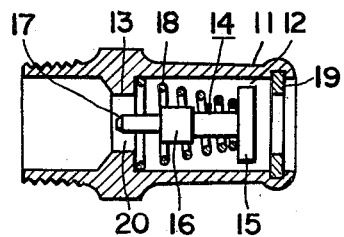
FIGS. 8 to 10 are schematic sectional views illustrating different ventilation valves according to the invention.
Figure 9:
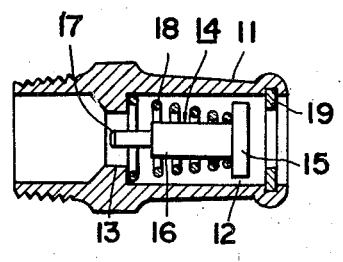
Figure 10:
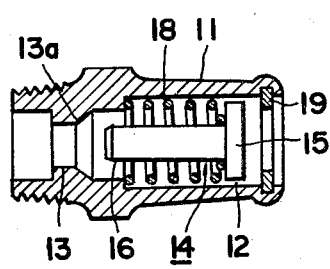

In the illustrated embodiment, as shown in FIGS. 2a to 3, the transitional portion between the metering portion 16 and the guide member 17 of the rod 14 is chamfered for facilitating the alignment of the rod 14 with the orifice 13. Such chamfered portion is, however, not essential to the present invention, and it is possible to define the metering portion 13 by a cylindrical surface of a certain diameter and a pair of parallel circular planes, as depicted in FIG. 8. Furthermore, in order to simplify the manufacture of a rod 14, two metering portions 15 and 16 can be connected directly in axial alignment, as shown in FIG. 9, or a rod 14 can be formed without adding any guide member, as shown in FIG. 10. In case of the rod 14 having no guide member, as shown in FIG. 10, it is preferable to taper that edge of the orifice 13 of the housing 11 which faces the metering portion 16, as represented by 13a in the figure.

FIG. 3 illustrates another embodiment of the crank-case ventilation valve according to the present invention, in which the inner opening of a ring-shape washer 19 acts as an orifice 12 for controlling the gas flow rate through the ventilation valve.

The operation of the ventilation valve according to the present invention, having the aforesaid construction, will now be described. In FIG. 1, fresh air from the air cleaner 6 is delivered to the crankcase 3 through the hose 7 and the rocker cover 2, so as to clean up the gas within the crankcase 3, and the discharge gas from the crankcase 3 is delivered to the intake manifold 4 through the pipe 8, so that the discharge gas from the crankcase can be burned in the cylinder portion 1 together with a mixture fed thereto from the carburetor 5. The ventilation valve 9 according to the present invention is mounted on the pipe 8 for controlling the flow rate of blowby gas delivered to the intake manifold 4 therethrough.

FIG. 2a shows the position of the rod 14 and the coiled spring 18 relative to the housing 11, under the conditions that the engine equipped with the crankcase ventilation valve is heavily loaded. Under such conditions, the gas flow rate through the ventilation valve 9 is controlled by the metering portion 15 of the rod 14 and the orifice portion 12 of the housing 11, and the guide portion 17 is located in the orifice 13 and acts merely as a guide member for guiding the movement of the rod 14 in the orifice 13.

FIG. 2d illustrates the relative position of the rod 14 and the coiled spring 18 when the engine is lightly loaded. In this case, the flow rate through the ventilation valve 9 is controlled by the gap between the metering portion 16 of the rod 14 and the orifice 13. The coiled spring 18 is compressed, but individual spiral turns of the coiled spring 18 are spaced without coming into contact with each other. Thus, gas flows through spaces between adjacent spiral turns of the coiled spring.

The relative dimensions of the orifices are determined such that the flow area between the large orifice 12 and the first metering portion 15 is smaller than the area between the second orifice 13 and the guide rod 17. Also, the flow area between the second orifice 13 and the second metering portion 16 is the smallest of the three flow areas. The pressure drop across the valve rod 14 is determined by the size of the first orifice 12 and the metering portion 15 at low negative intake manifold pressure, and by the second orifice 13 and the second metering portion 16 at high-negative intake manifold pressure, as shown in FIGS. 2a and 2d, respectively. As the effective area to which the pressure differential is applied is larger at low-negative pressures, the rod 14 is effectively displaced both at low- and high-negative pressures.

FIGS. 2b and 2c illustrate the relative positions of the rod 14 and the coiled spring 18 when the internal combustion engine equipped with the crankcase ventilation valve according to the present invention is loaded at two intermediate levels.

Figure 4:
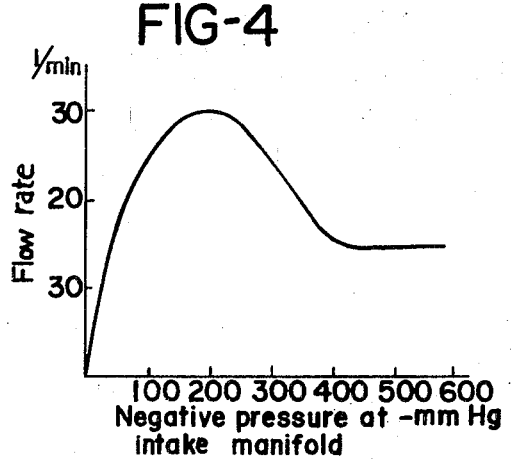
FIG. 4 is a graph, illustrating an ideal engine intake pressure-gas flow rate characteristics of a crankcase ventilation valve.

FIG. 4 shows an ideal negative pressure-flow rate characteristics to be achieved by the crankcase ventilation valve according to the present invention. In the figure, the abscissa represents the negative pressure (−mm.Hg.) at the intake manifold of the engine, and the ordinate represents the flow rate (lit./min.) of gas through the crankcase ventilation valve.

Figure 5:
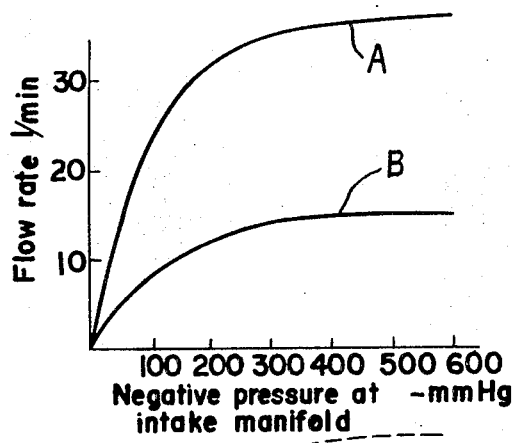
FIG. 5 is a graph showing the intake pressure-flow rate characteristics of an embodiment of the crankcase ventilation valve according to the present invention, taken under the conditions that two orifices of the ventilation valve are actuated separately, respectively.
Figure 6:
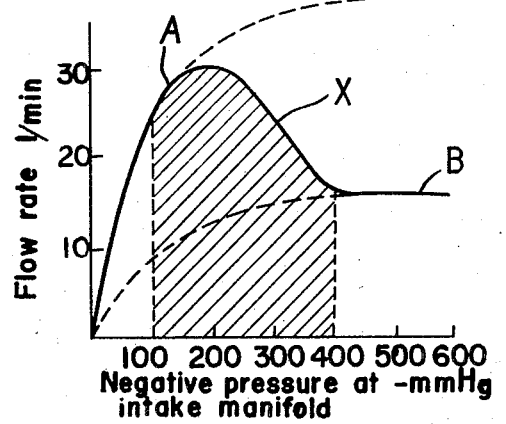
FIG. 6 is the intake pressure-flow rate characteristics of a crankcase ventilation valve having a pair of orifices of preferable configuration.

FIG. 5 shows the flow rate characteristics of the crankcase ventilation valve according to the present invention, under the assumption that the two orifices of the ventilation valve were actuated separately. The curve A represents the flow rate characteristics of the metering portion 15 of the rod 14 for controlling high-flow rates during heavy load, while the curve B represents the corresponding flow rate characteristics of the metering portion 16 for controlling low-flow rates during light load. FIG. 6 is an overall operative characteristics of the crankcase ventilation valve according to the present invention, having the aforesaid pair of orifice portions 12 and 13. As can be seen from the figure, the crankcase ventilation valve according to the present invention operates along the curve A of FIG. 5, when the engine is run at a heavy load with the absolute value of a negative pressure at the intake manifold of about 100 mm.Hg. or smaller in its absolute value, while the ventilation valve operates along the curve B of FIG. 5, when the engine is run at a light load with a negative pressure at the intake manifold of about 400 mm.Hg. or larger in its absolute value.

In the illustrated embodiment, in order to connect the curve A with the curve B, when the negative pressure at the intake manifold is in the range of 100 mm.Hg. to 400 mm.Hg. in absolute value, the diameter of the metering portion 15 is selected to be twice as large as that of the metering portion 16. Accordingly, when the absolute value of the negative pressure at the intake manifold is 100 mm.Hg. or smaller in its absolute value, the effective pressure receiving area of the rod 14 is four times as large as the corresponding pressure receiving area for the case of the intake manifold negative pressure in the range of 400 mm.Hg. or larger in its absolute value.

More particularly, as the negative pressure in the intake manifold is increased, the valve rod 14 is displaced leftward in the drawings and the downstream peripheral edge of the metering portion 16 is near the upstream peripheral edge of the orifice 13. The area formed by an imaginary conical surface 20, shown in FIGS. 2b and 2c by connecting the downstream edge of the metering portion 16 and the upstream edge of the orifice 13 gradually decreases as the valve rod 14 is displaced leftward, in the downstream direction, until the pressure drop across the conical surface acts as a portion of the overall pressure drop across the valve rod 14. Thus, the relative pressure drop across the first orifice 12 and the first metering portion 15 is decreased, as is the pressure drop across the imaginary conical surface between the upstream edge of the second orifice 13 and the downstream edge of the second metering portion 16. As the effective area of the first metering portion is larger than the effective area of the second orifice 13, the overall differential pressure applied to the valve rod 14 is relatively decreased and the rod 14 is displaced slowly, as indicated by the transient portions of the curves A and B in the Figures.

As the valve rod 14 is further displaced leftward, the area of the imaginary conical surface-described above becomes the same as the area between the first orifice 12 and the first metering portion 15 so that pressure drops across both portions are the same. When this point is reached, as the area of the imaginary conical surface is decreased further, the pressure drop across the imaginary conical surface plays a major part in the overall pressure drop across the rod 14. As the pressure differential across the metering portion 15 is decreased, the effective area to which the overall pressure drop across the valve rod 14 is decreased considerably, so that valve rod 14 is displaced slowly in the leftward direction, even though the negative pressure in the intake manifold 4 is further increased.

As the negative pressure in the intake manifold 4 is further increased, the left edge of the second metering portion 16 moves into cooperation with the second orifice 13. As the effective flow area between the second orifice 13 and the second metering portion 16 reaches it smallest value, the pressure drop across the second metering portion 16 represents the pressure drop across the valve rod 14. After this point is reached, since the flow rate of the gas through the valve is nearly sonic velocity the flow rate is nearly constant along curve B in FIG. 5 whether or not the negative pressure is increased.

As described above, at the transition portion of curves A and B shown in FIGS. 5 and 6, the main pressure drop portion of the overall pressure drop across the rod 14 gradually moves from the first metering portion 15 to the second metering portion 16. Also, the effective area to which the differential pressure is applied decreases gradually from the area of the first metering portion 15 to that of the second metering portion 16. Thus, the desired transition curve X shown in FIG. 6, is obtained. Furthermore, the displacement of the valve rod 14 in the leftward direction is slowed as the negative pressure in the intake manifold 4 continues to increase, so that the entire operation and movement of the valve can be controlled by a single conical spring 18.

Figure 7:
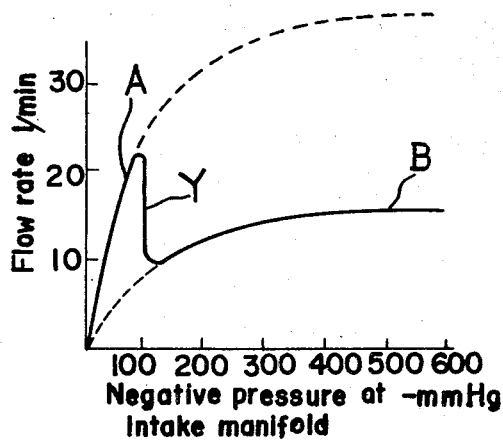
FIG. 7 is the intake pressure-flow rate characteristics of a crankcase ventilation valve having a pair of orifices of undesirable configurations.

If the outside diameters of the two metering portions 15 and 16 of the rod 14 are substantially the same with each other, the operative characteristic of the ventilation valve varies rapidly at the intake manifold negative pressure of about 100 mm.Hg. in absolute value, as shown by the curve Y of FIG. 7. Such rapid variation of the flow rate through the ventilation valve is not desirable at all.

Judging from a number of tests carried out by the inventor, it is essential that the two metering portions have different diameters, and if the ratio of the diameter of the metering portion 16 to that of the other metering portion 15 is in a range of 1.5 to 5, satisfactory control of the gas flow through the ventilation valve can be achieved. The gas flow through the ventilation valve proved to be most effectively controlled when the aforesaid diameter ratio lies between 1.5 to 3.

In other words, according to the present invention, by determining the outside diameters of the metering portions 15 and 16 in the range as described in the foregoing, the flow rate of gas through the crankcase ventilation valve can be automatically controlled by the aforesaid gap 20, as long as the intake manifold negative pressure is in an intermediate range of 100 to 400 mm.Hg. in absolute value. Furthermore, what is actually required for the metering portion 15 of the rod 14 and the orifice portion 12 of the housing 11 to do is only the flow rate control in the range corresponding to the intake manifold negative pressure of 0 to 100 mm.Hg. in absolute value. The flow rate of gas for such range of the intake manifold negative pressure is found to be rather insensitive to the cross sectional area of the passage of the gas, and hence, there is not any strict requirement on the dimension of the metering portion 15 of the rod 14 and the orifice 12 of the housing 11. Thereby, the manufacture of the housing 11 and rod 14 can be greatly simplified.

FIG. 2e shows the position of the rod 14 and the spring 18 when a back fire takes place in the engine. As can be seen from the figure, the rod 14 is brought into tight contact with the washer 19, whereby, the propagation of the effects of the back fire to other portions thereof is prevented.

As described in the foregoing, according to the present invention, there is provided a crankcase ventilation valve including a combination of a pair of orifice portions and cooperating nontapered metering portions formed on a rod, whereby the need of accurately prepared orifice and the accurately tapered metering portions prepared by precision work in known crankcase ventilation valves for achieving the desired control of gas flow rate can be completely eliminated. Besides, the crankcase ventilation valve according to the present invention can be manufactured with ease, and the operative characteristics of the crankcase ventilation valve according to the present invention can be freely modified over a considerably wide range.

I claim:

1. A crankcase ventilation valve for use in an internal combustion engine having an intake manifold and a crankcase, said ventilation valve being disposed between said crankcase and said intake manifold of said engine for controlling the flow rate of gas from the crankcase to the intake manifold, said crankcase ventilation valve comprising, a cylindrical housing, a first orifice and a second orifice formed in said housing, said first orifice having a diameter larger than said second orifice and being disposed on the upstream side of said second orifice, a rod coaxially positioned in said housing, said rod having a first and a second metering portion spaced longitudinally on said rod, said first metering portion having a diameter larger than said second metering portion, said first metering portion cooperating at all times with said first orifice, said second metering portion being movable into said second orifice at relatively high negative intake manifold pressure, said first metering portion cooperating with said first orifice and adapted to define a first flow restriction having an effective area across the valve to form a first main differential pressure applying area when said second metering portion is not cooperative with said second orifice said second metering portion defining a second flow restriction having smaller effective area than that of the first restriction and forming a second main differential pressure applying area to nullify flow restriction effect of the first restriction when cooperating with said second orifice, and a spring inserted between said housing and said rod, said spring acting to bias said second metering portion away from said second orifice, whereby the flow rate across the rod and the rate of displacement of the rod decrease as the intake manifold negative pressure increases and the second flow restriction is formed.

2. A crankcase ventilation valve as claimed in claim 1, wherein said second metering portion is positioned within said housing upstream of said second orifice at low-negative pressure in the intake manifold with the upstream peripheral edge of said second orifice cooperating with the downstream peripheral edge of said second metering portion of said rod to gradually restrict fluid flow through said valve as said rod is moved toward said second orifice against the biasing force of said spring by increasing said negative pressure in said intake manifold thereby causing a decrease in the pressure drop across said first metering portion and the effective area to which the differential pressure is applied so that the flow rate across the rod and the displacement rate of the rod is decreased as the negative pressure in said intake manifold is increased.

3. A crankcase ventilation valve for use in an internal combustion engine having an intake manifold and a crankcase, said ventilation valve being disposed between said crankcase and said intake manifold of said engine for controlling the flow rate of gas from the crankcase to the intake manifold, said crankcase ventilation valve comprising, a cylindrical housing, a larger diameter cylindrical inner surface formed in said housing and forming a first orifice, a smaller diameter second orifice formed in downstream end of said housing, a rod coaxially positioned in said housing, said rod having a disklike larger diameter first metering portion at upstream end cooperating at all times with said first orifice, said rod further having a rod like smaller diameter second metering portion which is movable into said second orifice at relatively high negative intake manifold pressure, said first metering portion cooperating with said first orifice to define a first flow restriction having an effective area across the valve to form a first main differential pressure applying area when said second metering portion is not cooperating with said second orifice, and said second metering portion defining a second flow restriction having a smaller effective area than that of the first restriction and forming a second main differential pressure applying area to nullify the flow restriction effect of the first restriction when cooperating with said second orifice, and a spring inserted between said housing and said rod, said spring acting to bias said second metering portion away from said second orifice, whereby the flow rate across the rod and the rate of displacement of the rod decreases as the intake manifold negative pressure increases and the second restriction is formed.

4. A crankcase ventilation valve for use in an internal combustion engine having an intake manifold and a crankcase, said ventilation valve being disposed between said crankcase and said intake manifold of said engine for controlling the flow rate of gas from the crankcase to the intake manifold, said crankcase ventilation valve comprising, a cylindrical housing, a washer positioned in the upstream end of said housing and forming a first orifice, a second orifice formed in downstream end of said housing and having smaller diameter than that of the first orifice, a rod having a larger diameter portion extending longitudinally into said washer at all times and forming a first metering portion and being movable into said second orifice at relatively high negative intake manifold pressure, said rod having a second diameter portion defining a second metering portion, said first metering portion cooperating with said first orifice to define a first flow restriction having an effective area across the valve for forming a first main differential pressure applying area when said second metering portion is not cooperating with said second orifice, and said second metering portion defining a second flow restriction having a smaller effective area than that of the first restriction and forming a second main-differential pressure applying area to nullify the flow restriction effect of the first restriction when cooperating with said second orifice, and a spring inserted between said housing and said rod, said spring acting to bias said second metering portion away from said second orifice, whereby the flow rate across the rod and the rate of displacement of the rod decrease as the intake manifold negative pressure increases and the second restriction is formed.

* * * * *